United States Patent [19]

Lee

[11] 4,106,822
[45] Aug. 15, 1978

[54] TRACK GUIDE MECHANISM

[75] Inventor: Richard A. Lee, Warren, Mich.

[73] Assignee: The United States of America as represented by the Secretary of the Army, Washington, D.C.

[21] Appl. No.: 777,253

[22] Filed: Mar. 14, 1977

[51] Int. Cl.² .............................................. B62D 55/14
[52] U.S. Cl. .......................................... 305/28; 305/57
[58] Field of Search .................. 305/56, 57, 35 R, 28, 305/27; 74/243 PC

[56] References Cited

U.S. PATENT DOCUMENTS

| | | |
|---|---|---|
| 1,733,526 | 10/1929 | Coburn et al. ..................... 305/57 X |
| 2,596,501 | 5/1952 | Montgomery ............. 74/243 PC X |
| 2,996,338 | 8/1961 | Hill ..................................... 305/57 X |
| 3,020,095 | 2/1962 | Backhaus ........................ 305/35 R X |

Primary Examiner—Robert B. Reeves
Assistant Examiner—John P. Shannon
Attorney, Agent, or Firm—Peter A. Taucher; John E. McRae; Nathan Edelberg

[57] ABSTRACT

A tracked vehicle, such as a military tank, wherein the prong type guides for the tracks are located on the roadwheels rather than on the tracks. The guide prong location puts the guide surfaces closer to the line-of-action of the disturbing force (ground surface) so that the guides are less likely to break or distort.

1 Claim, 12 Drawing Figures

TURN DIRECTION

TRACK GUIDE MECHANISM

The invention described herein may be manufactured, used, and licensed by or for the Government for governmental purposes without payment to me of any royalty thereon.

BACKGROUND AND SUMMARY OF THE INVENTION

Under conventional practice military tracked vehicles are equipped with cylindrical roadwheels that ride along the upper faces of the hingedly-connected blocks that form the endless tracks. The roadwheels are usually carried by roadarms that are swingably attached to the hull sidewalls; spring (suspension) elements within the hull act downwardly on the roadarms (and upwardly on the hull) so that the hull weight is resiliently transmitted through the roadarms to the roadwheels. Terrain disturbances produce momentary increases in the upwardly-directed ground reaction forces on the wheels; the wheels thereby are displaced upwardly in accordance with the terrain disturbance. Optimum suspension action maintains the hull in a stable attitude irrespective of the magnitude or frequency of terrain disturbance.

Especially at high speeds or during pivot turns, the road disturbances can produce sidewise track dislocations. To counteract such actions it is common practice to equip the tracks with upstanding prong-like guides at regularly-spaced points therealong. The roadwheels are in turn formed with peripheral guide grooves, so that as the roadwheels roll along the track upper faces the grooves in the wheels will move past successive ones of the prongs; the prong side surfaces scrape on the wheel groove surfaces to maintain the tracks and wheels in vertical alignment.

Since the prongs extend upwardly from the track plane the effective prong surfaces are located well above ground level where the disturbing forces are generated. The line-of-action of the counteracting force (the wheel scrape area) is thus displaced from the line-of-action of the disturbing force, with consequent disadvantages as regards excessive loadings on the prongs, potential tilting of the track blocks, and excessive wear on the block connector pins.

The present invention involves relocation of the track guide system so that the prongs are on the roadwheels rather than on the tracks. The prongs extend downwardly from the roadwheels into guide openings in the tracks, so that guide action is accomplished nearer to the ground surface. This minimizes the extent of the force couple that exists between the disturbance force and guide force. The invention hopefully will reduce wear and breakage of various mechanisms in the wheel-track system.

THE DRAWINGS

Figure 9:
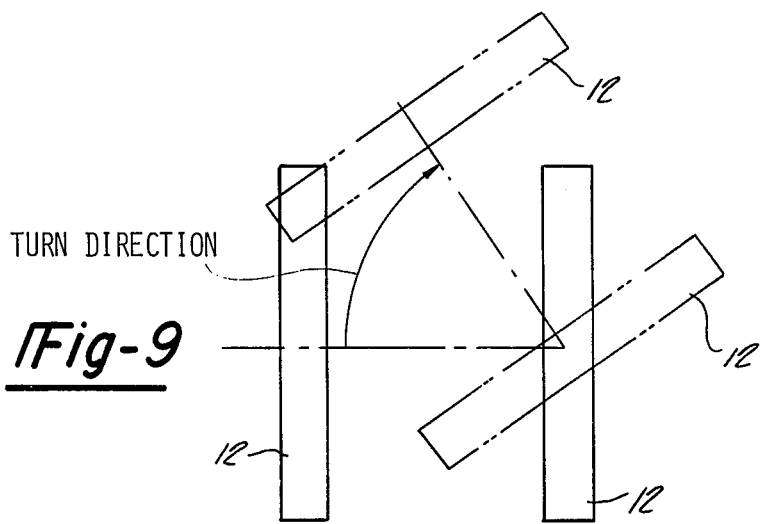

FIG. 9 diagrammatically shows positions taken by the tracks of a tank during a turning maneuver.

Figure 10:
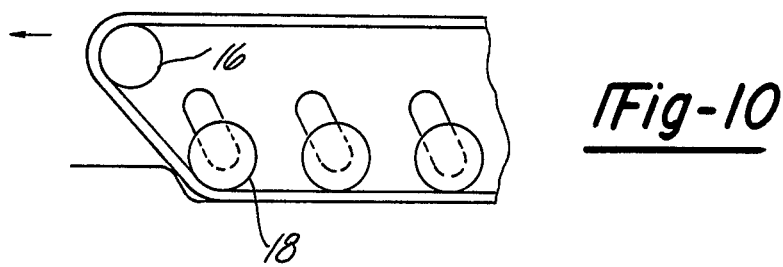
Figure 11:
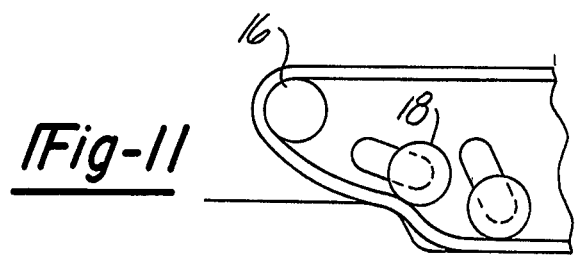
Figure 12:
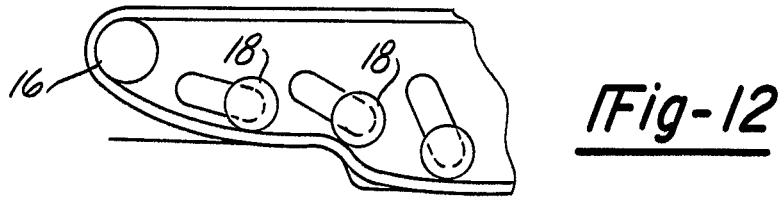

FIGS. 10 through 12 roadwheel conditions during movement of a vehicle over an obstacle.

Figure 1:
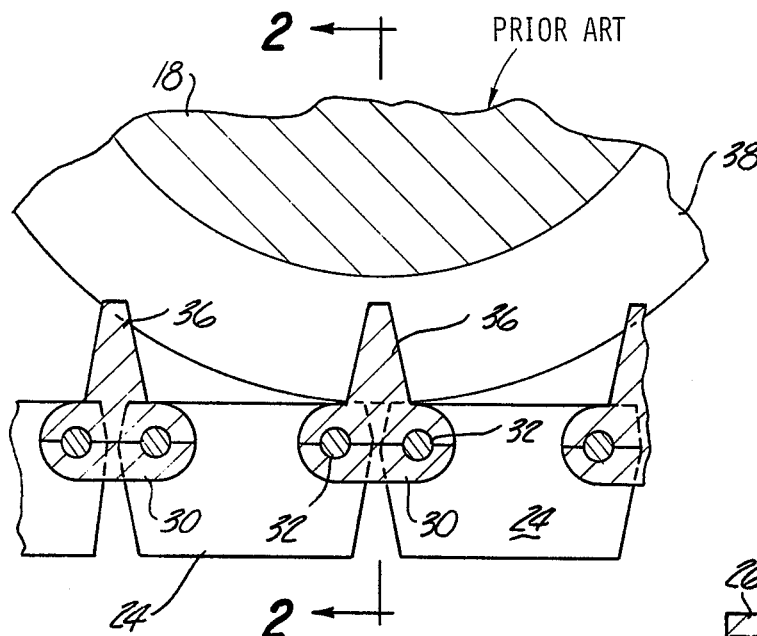
FIG. 1 is a sectional view taken through a roadwheel-track mechanism constructed according to prior art practice.
Figure 2:
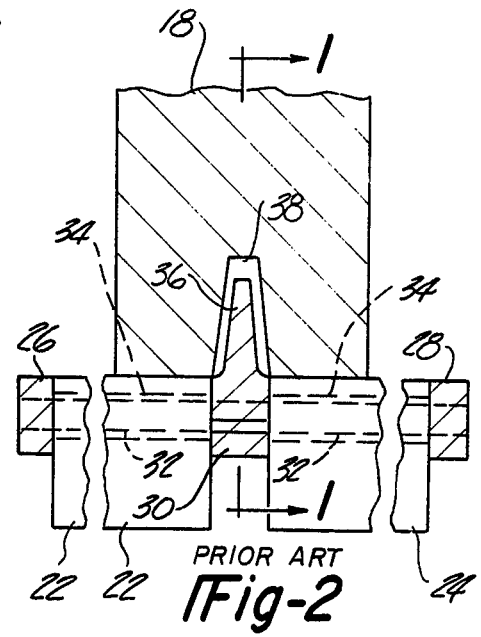
FIG. 2 is a sectional view taken on line 2—2 in FIG. 1.
Figure 5:
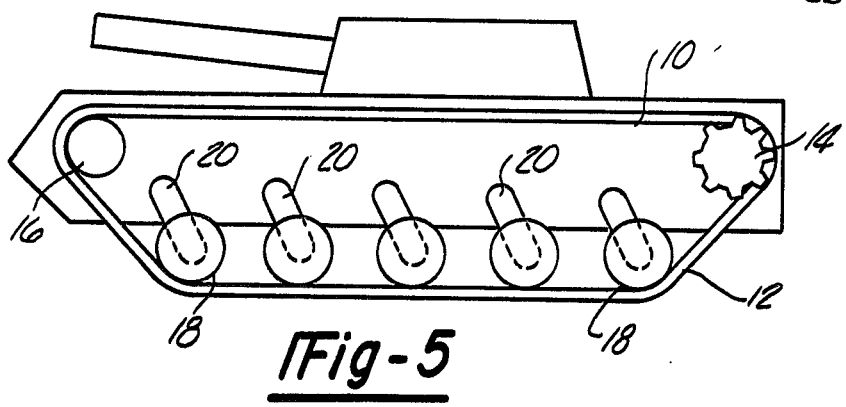
FIG. 5 is a reduced scale side elevational view of a military tank using a conventional track system. This view is merely to illustrate the general environment in which my invention is utilized.

PRIOR ART SYSTEM (FIGS. 1, 2 and 5)

FIG. 5 shows in a semi-schematic fashion a conventional military tracked vehicle comprising a hull 10, endless track 12, track-driving sprocket 14 at the rear end of the hull, idler wheel 16 at the forward end of the hull, and roadwheels 18 individually mounted on spindles at the trailing ends of roadarms 20. The leading end of each roadarm is swingably attached to a torsion bar extending transversely through the hull, whereby each roadwheel can move upwardly as the vehicle moves over obstacles, such as bumps or ditches. The torsion bars resiliently support the weight of the hull (sprung mass) while enabling the hull to maintain a reasonably level attitude.

FIGS. 1 and 2 show some details of a conventional track-roadwheel system. As shown, the track comprises two rows of ground-engaging blocks (or pads) 22 and 24 interconnected by two sets of end connectors 26 and 28, and one set of center connectors 30. Each end connector is clamped or otherwise rigidly affixed to two transverse pivot pins 32 running through oversize openings in blocks 22 and 24. Elastomeric sleeves 34 are bonded to the outer surfaces of pins 32 and the concentric openings in the blocks, whereby the pin-block joint is effectively sealed against dirt that would otherwise contribute to early wearout of the pins.

Each center connector 30 includes an upstanding prong-type guide 36 that extends into a peripheral groove 38 in each roadwheel 18 and idler wheel 16. The guide prong is intended to prevent lateral shift of blocks 22 and 24 relative to the wheel centerplane, especially when the vehicle is operating on sloped surfaces or is executing a pivot turn.

Figure 6:
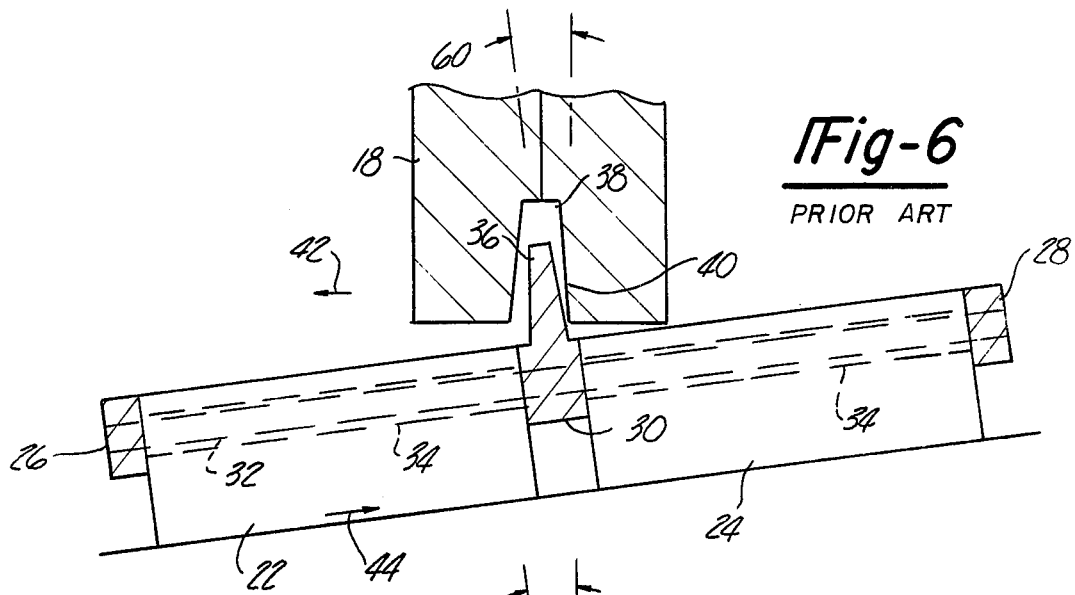
FIGS. 6 and 7 are views of the FIG. 1 and FIG. 3 arrangements, showing operation of the respective tracks in side-hill attitudes.

FIG. 6 shows the wheel-track orientation during sloped or "side hill" operations. The large sprung mass and/or track tension tends to move roadwheel 18 in the downhill direction so that prong 36 scrapes against the right face of groove 38, as at 40. Each roadwheel in the system is affected in a similar fashion as the roadwheels roll forwardly over the upper faces of blocks 22 and 24.

FIG. 9 illustrates two positions taken by the vehicle tracks 12,12 during a pivot turn. The track position at start of the turn is illustrated in full lines; the track position at a later stage of the turn is illustrated in dashed lines. Assuming that the right track is "braked" for a right turn, it will be seen that during the pivot turn all of the various terrain-engaged blocks (22 or 24) are forced to shift or slide laterally on the terrain surface. The shift forces are applied to the track blocks through the roadwheels 18 and upstanding guide prongs 36. The line-of-action of this force is considerably above the resistance line-of-action (ground surface). Therefore there is created an undesired secondary force tending to upset and/or overturn the track.

Figure 3:
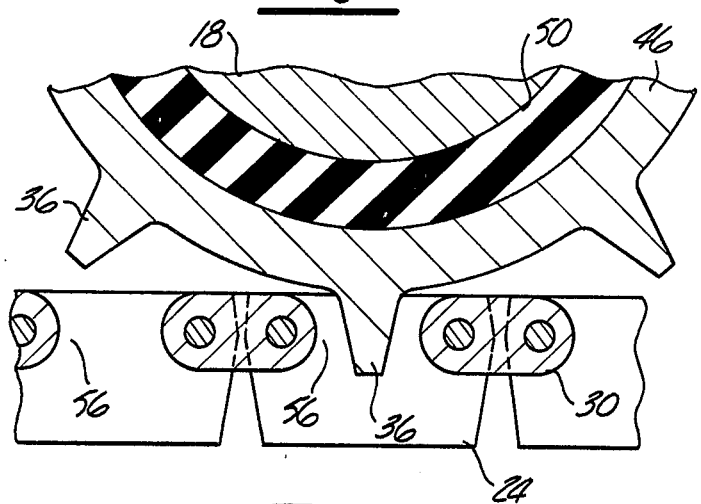
FIGS. 3 and 4 are views taken in the same directions as FIGS. 1 and 2, but of an arrangement constructed according to this invention.
Figure 4:
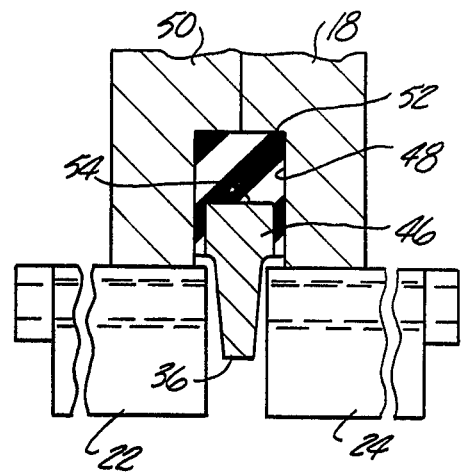
Figure 8:
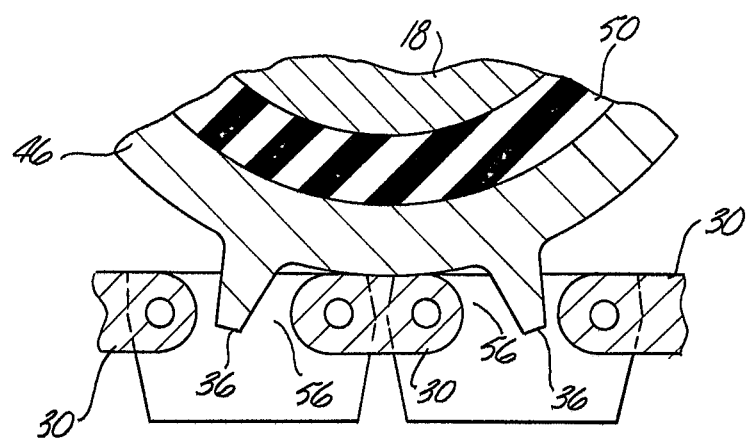
FIG. 8 is a view similar to FIG. 3 but showing the roadwheel rotated a few degrees from its FIG. 3 position.

This overturn force is not apparent in FIG. 9, but may be visualized from FIG. 6, wherein numeral 42 represents the line-of-action of the roadwheel force, and numeral 44 represents the line-of-action of the resistance offered by blocks 22 and 24. The vertical separation of these opposing forces represents the generated force couple tending to overturn the blocks in a counterclockwise direction. Of course the blocks will not actually overturn. Instead, the overturn force will be absorbed by roadwheel grooves 38, prongs 36, pins 32 and the various connector links 26, 28 and 30. An aim of the present invention is to reduce this undesired moment arm represented by the spacing between forces 42 and 44, thereby reducing the "overturn" forces and associated stress and/or frictional wear. FIGS. 3, 4 and 8 illustrate one embodiment of the invention.

Figure 7:
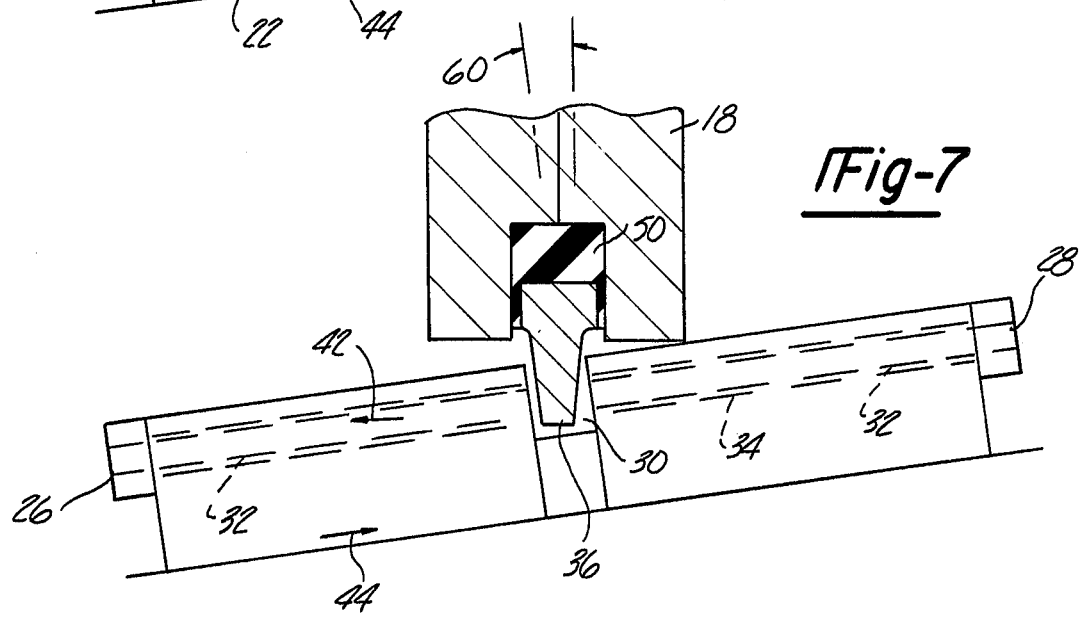

In the FIG. 3 arrangement the guide prongs have been relocated from the center connectors 30 to the roadwheel 18 so that each guide prong is now a tooth projecting from the roadwheel peripheral surface. FIG. 7 illustrates sidehill performance for the FIG. 3 system. By comparing FIGS. 6 and 7 it will be seen that relocation of the guide on the roadwheel considerably reduces the moment arm or force couple distance associated with high loadings on the roadwheel, guides, connector pins, and connector links. This force couple distance is the spacing between force lines 42 and 44.

Optimum performance of the FIG. 3 system requires that the roadwheels be synchronized with the tracks, i.e. that each tooth 36 enter into the open space between adjacent connectors 30 rather than striking or hanging on a connector upper surface. It may not be possible to always have the desired roadwheel-track synchronization. For example, as shown in FIGS. 10 through 12, a vehicle traversing an obstacle may momentarily generate slack in the track due to roadwheel deflection (with consequent decrease in the size of the track envelope). Other effects, not apparent from FIGS. 10 through 12, are skidding of roadwheels on the track upper face, and disengagement of roadwheels from the track due to shock forces on the roadarms. These miscellaneous effects or conditions promote non-synchronization. To achieve some measure of synchronization of the tooth and track opening I prefer to design the system so that the teeth are resiliently mounted on the roadwheel for limited circumferential displacement in response to forcible engagement of a tooth with a center connector 30.

As shown in FIGS. 3 and 4, the teeth are carried by a floating ring 46 located within an annular groove 48 in the roadwheel. An elastomeric sleeve 50 is bonded to the groove bottom surface 52 and the ring inner surface 54. The elastomeric sleeve has sufficient radial thickness that when (or if) a tooth 36 strikes the upper surface of a connector 30 the resultant circumferential loading (transmitted to ring 46 and sleeve 50) will be torsionally and resiliently resisted by the elastomer without destruction of the bond at 52 or 54. Should the elastomer-metal bonds be broken, there will be no catastrophic failure; rather the ring 46 will merely rotate relative to the roadwheel, and tooth 36 will continue to serve its track-roadwheel alignment function. The purpose in bonding sleeve 50 to the roadwheel and ring 46 is to enable "new" teeth 36 to be continually presented to the track openings. Sleeve 50 is thick enough to torsionally deflect about a one tooth pitch distance without bond destruction.

It will be realized that teeth 36 (FIG. 3) are not "driving" teeth. Therefore the teeth have lesser circumferential dimensions than the corresponding length of guide openings 56 in the track. The relative dimensions are selected as a compromise for minimizing the possibility of a tooth striking a connector 30 against undue weakening of the tooth in the transverse direction (directional line 42 in FIG. 7).

Teeth 36 do not normally engage the upper faces of track blocks 22 and 24 because they occupy the central vertical plane between the two rows of blocks. However, if track-roadwheel misalignment should occur then the tips of teeth 36 will ride or chatter along the block upper faces. Ring 50 is preferably of sufficient radial thickness and elasticity as to deflect an appreciable radial distance, to at least partially reduce the destructive pressure forces tending to break the teeth and or perforate the track blocks. Also, the tips of the teeth may be flattened or squared to reduce unit area forces for further minimizing the destructive effects.

By comparing FIGS. 6 and 7, it will be seen that for a given tilt of the track system (represented by numeral 60) the FIG. 6 teeth will be displaced laterally a greater distance than the FIG. 7 teeth. This "greater distance displacement" feature is related to the fact that the tooth line-of-action 42 in FIG. 6 is displaced further above the ground surface where the tilt action originates. The relatively large tooth displacement or "wobble" in FIG. 6 requires that groove 38 in the roadwheel be considerably oversize in the lateral transverse direction. Under some circumstances such oversizing could enable the tracks to stray laterally before the onset of guide action by the roadwheels. There is thus a tendency for undesired play to grow or propogate down the length of the track system, from one roadwheel to another. In the system of FIGS. 3, 4, 7 and 8 the teeth 36 thickness (in the line 42 direction) can be almost as great as the width of connectors 30 and guide opening 56. This "close clearance" condition minimizes the tendency for misalignment forces to grow and magnify along the track system.

The principal novel feature of the invention is the relocation of the guide prongs or teeth from the track to the roadwheel. As noted above, this puts the guide plane nearer to the ground surface, and thereby minimizes an undesired force couple between the disturbance force and counteracting force. The various features of the inventions are more specifically recited in the appended claims.

I wish it to be understood that I do not desire to be limited to the exact details of construction shown and described for obvious modifications will occur to a person skilled in the art.

I claim:

1. In a tracked vehicle comprising a hull, ground-engaging tracks, and hull-mounted roadwheels riding on the track upper faces to absorb road shock forces, each track comprising two rows of ground-contacting blocks, end connectors pivotally joining the blocks along their outer side edges, and center connectors pivotally joining the blocks along their inner facing side edges: the improvement wherein the spaces between adjacent ones of the center connectors are utilized as guide openings to maintain track-roadwheel alignment; selected ones of the roadwheels having guide teeth thereon cooperable with the aforementioned guide openings; each selected roadwheel comprising two axially spaced cylindrical sections ridable on a row of ground-contact blocks, and a series of teeth arranged in the central transverse plane of the wheel for entry into successive ones of the guide openings as the wheel rolls along the block upper surfaces; the side faces of the teeth cooperating with edge surfaces of the blocks to maintain the track in alignment with the roadwheels; each tooth having a circumferential thickness substantially less than the length of each guide opening, whereby the teeth are precluded from striking the center connectors even though the associated roadwheel should slightly advance or retract along the track upper surface; means resiliently connecting the teeth to the associated roadwheel comprising an endless rigid ring (46) having said teeth extending therefrom, said ring being located within an annular groove formed in the peripheral surface of the associated roadwheel, and an endless elastomeric sleeve bonded to the ring inner surface and groove bottom surface, so that circumferential loads on the teeth produce torsional stress in the elastomeric sleeve without destruction of the above-mentioned bonds; said ring having sufficient radial thickness to maintain its initial configuration under load forces on the teeth; each elastomeric sleeve having a substantial radial thickness, whereby the sleeve can undergo torsional strain equivalent to the length of a center connector.

* * * * *